United States Patent [19]

Gangemi

[11] Patent Number: 5,068,513
[45] Date of Patent: Nov. 26, 1991

[54] WATER JET SLITTER WITH LASER FINISH AND METHOD

[75] Inventor: Donald Gangemi, Great Barrington, Mass.

[73] Assignee: Beloit Corporation, Beloit, Wis.

[21] Appl. No.: 589,369

[22] Filed: Sep. 28, 1990

[51] Int. Cl.[5] .............................................. B23K 26/00
[52] U.S. Cl. .......................... 219/121.67; 219/121.72; 219/121.84
[58] Field of Search ...................... 219/121.72, 121.67, 219/121.84

[56] References Cited

U.S. PATENT DOCUMENTS

| | | | |
|---|---|---|---|
| 3,532,014 | 10/1970 | Franz | 83/53 |
| 3,582,466 | 6/1971 | Quirk | 162/286 |
| 4,182,170 | 1/1980 | Grupp | 83/177 |
| 4,239,448 | 12/1980 | Graf | 415/89 |
| 4,266,112 | 5/1981 | Niedermeyer | 219/121.72 |
| 4,567,796 | 2/1986 | Kloehn et al. | 83/53 |
| 4,573,382 | 3/1986 | Kloehn et al. | 83/53 |
| 4,908,494 | 3/1990 | Faiz et al. | 219/121.72 |
| 4,928,838 | 5/1990 | Imamura | 219/121.69 |
| 4,952,770 | 8/1990 | Hayashi | 219/121.67 |
| 4,952,771 | 8/1990 | Wrobel | 219/121.67 |

*Primary Examiner*—C. L. Albritton
*Attorney, Agent, or Firm*—Dirk J. Veneman; Raymond W. Campbell; Gerald A. Mathews

[57] ABSTRACT

A high pressure water jet is used in conjunction with a relatively low power laser to produce a smooth cut in a traveling web. The cutting procedures produces a relatively small amount of fiber dust in the atmosphere surrounding the cutting operation. The water jet severs the traveling web into separate parts, and the laser is directed to the severed edges to burn away the protruding ends of the paper fibers to produce a uniform, smooth cut in both severed edges. A trough is disposed on the side of the web opposite the water jet and laser to receive and collect the water severing the web and the fiber dust, and to diffuse the laser beam emissions.

10 Claims, 2 Drawing Sheets

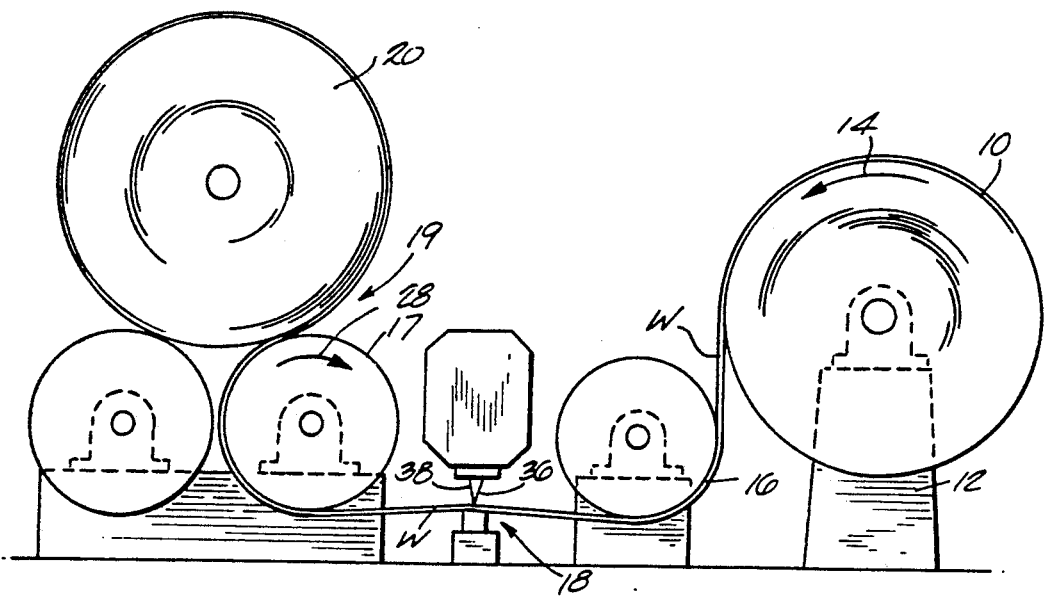
Fig. 1
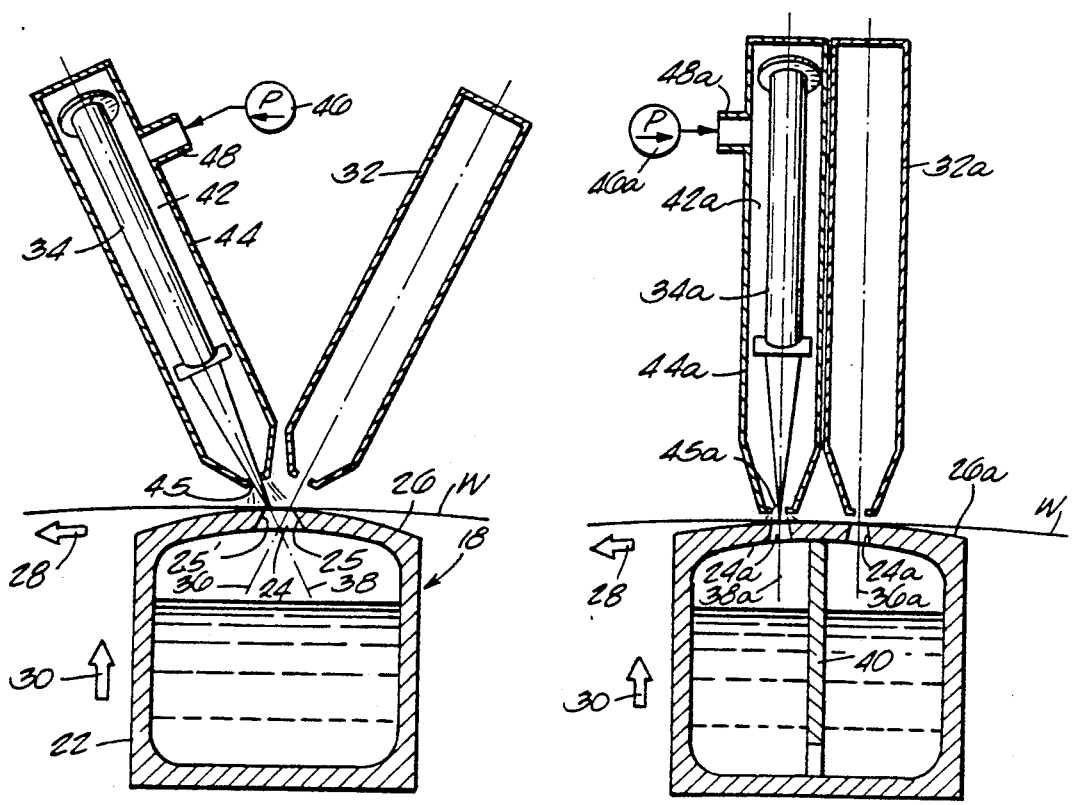
Fig. 2
Fig. 3

WATER JET SLITTER WITH LASER FINISH AND METHOD

BACKGROUND OF THE INVENTION

1. Field of the Invention

This invention relates to the slitting of a traveling fibrous web, particularly a paper web. More particularly, this invention relates to the slitting of a traveling paper web utilizing both a water jet and a laser. Still more particularly, this invention relates to the efficient slitting of a traveling paper web utilizing a water jet to sever the web, and a laser to cut the edges to produce a smooth edge on the severed parts.

2. Description of the Prior Art

The use of a high pressure water jet to cut a traveling web, such as paper, into strips is known in the paper-making art. Also known is the use of a laser beam to cut a fibrous web, such as paper. Both of these devices have been tried in an effort to improve the slitting results provided by a pair of cooperating rotating disks which have outer edges that rotate toward one another and intersect over the oncoming web passing therebetween to effect the cutting operation. Such disk-type slitters are well-known and represent the standard in the paper-making industry.

However, there are deficiencies and operating inefficiencies associated with the use of cooperating disks, lasers and high pressure water jets to effect the web slitting operation. In the case of cooperating disks, a great deal of dust is produced as the blades tear individual fibers from the paper web during the slitting process. In addition, disk slitters tend to produce edge cracks extending laterally in the paper being slit which, in turn, promotes lateral tearing and sheet breaks in the winding process on a papermaking machine or, even worse, during the printing process in the paper manufacturer's customer's plant. Finally, disk-type slitters require continual sharpening and/or replacement of the disks and must have transport and holder assemblies on both sides of the traveling web for each of the disks.

Perhaps the greatest deficiency in using water jets to slit a traveling paper web, especially a completely dried web, such as is the case in the winder, resides in the inherent nature of the severing process using a water jet. Specifically, the high pressure jet stream of water effects the web severance by impacting the individual paper fibers in the web. The actual severance is thus accomplished by physically pushing fillers, fines and individual fibers from the spot of jet stream impact outwardly toward the far surface and away from the web. Individual wood pulp fibers are not cut into pieces, but instead have fines, fillers and even small, or short, fibers washed away by the impact of the high pressure water jet. This leaves the ends of individual wood pulp fibers protruding from each severed edge of the web. The water jet cut results in a somewhat ragged pair of edges on either side of the slit in the web. This is both aesthetically unappealing, deleterious to subsequent processing of the paper product and generally undesirable to both the paper manufacturer and its customers.

In the case of a laser, the slit produced in the traveling web is well defined with a smooth, continuous edge from the standpoint of having few or no fiber ends protruding from the edge of the web. However, lasers powerful enough to cut a web at the speeds and calipers encountered in the paper manufacturing or winding operation tend to be relatively expensive to operate.

SUMMARY OF THE INVENTION

The deficiencies and operational inefficiencies of prior slitters have been obviated by this invention. In this invention, a high pressure water jet is used to sever the traveling paper web into two parts, or co-running strips. Operating in both physical and process cooperation with the water jet is a laser which traverses the same slit and burns away the protruding ends of the severed paper fibers in the adjacent edges of the slit strips. Thus, the water jet, which is relatively inexpensive to operate compared with a laser powerful enough to slit a web of the same caliper and traveling at the same speed, is used to sever the web while a laser having much less power than would otherwise be required to slit the web is used to burn off and trim the ends of the wood pulp fibers protruding from the severed edges of the paper strips.

A trough is positioned on the side of the web opposite the water jet and laser to receive the water and particles dislodged from the web from the impact of the water jet and burning operation of the laser. The trough can be either a small container positioned beneath the water jet and laser, and traverse the width of the web with them when they are repositioned, or it can extend for the width of the web and remain stationary. In either case, its primary purpose is to absorb the water jet energy, but it also operates to both capture fibrous particles and remove them with the collected water from the apparatus. The presence of a pool of water in the trough collected from the water jet also functions to diffuse spectral emissions from the laser and shield the laser from operating personnel. Since the water jet and laser are preferably mounted on the same side of the traveling paper web, no transport and holder assemblies are required for slitting equipment on the other side of the web which facilitates both the operation and maintenance of the apparatus.

In addition, an air jet is preferably used in conjunction with the laser to urge particles burned away from the ends of the pulp fibers downwardly and into the water trough. This is primarily to prevent dust from coming back onto the lens of the laser, which could produce a hot spot on the lens, but it also helps to decrease the amount of particles released into the atmosphere.

Neither the water jet nor laser functions to produce much force upon the web during operation. Accordingly, while the web preferably needs to be maintained in a relatively taut span to accommodate the aim and focus of the water jet and laser, the use of guide rolls, such as are used upstream and/or downstream of a disk-type slitter, are not required, although they may be used. In fact, it is anticipated that the cross-machine extending trough used to collect the water from the water jet can also be used to both effect the tension to provide a taut span in the traveling paper web as well as to maintain the severed edges of the web in the desired spaced adjacency, which may be only millimeters, or fractions thereof, in width. Further, it is contemplated that the interface between the traveling web and the trough could be air-lubricated to facilitate the operation.

In this invention, the laser is intended to be of much less power than would be required if the laser alone was utilized to slit the web. Further, since the laser is not utilized to sever the web, its beam does not have to be concentrated in the center of the web severance, but, perferably, is instead directed to the edges of the severance by use of a diffusion mode, such as, for example, the 01 mode which produces a beam in the shape of a donut, or torus, where the laser energy is not concentrated in a center spot, but is concentrated in a ring about a center spot. Other appropriate laser beam diffusion patterns can be utilized to either direct the laser's energy to the peripheral edges of a pattern, or in a pattern extending along the severance in the direction of web travel. Thus, such a pattern might resemble a rectangle extending along the severance, or it might take the form of two laterally arrayed spots relative to the direction of web travel (the so-called 11 mode). In any case, the laser's energy is concentrated to cut the protruding fibers and thus efficiently utilize its energy.

Accordingly, it is an object of this invention to provide an apparatus and method for efficiently slitting a paper web to produce strips having smooth, continuous edges on either side of the slit.

Another object of this invention is to provide an apparatus and method for slitting a traveling paper web utilizing a high pressure water jet in conjunction with a laser.

Still another object of this invention, as well as a feature and advantage thereof, is the provision of an apparatus and method for slitting a traveling web which does not utilize any cutting apparatus on one side of the web.

Another object, feature and advantage of this invention is to provide apparatus for producing a smooth cut in a traveling paper web wherein a water jet is utilized to sever the web and a relatively low power laser is utilized to provide a finished edge on the paper web on either side of the cut.

A feature and advantage of this invention is the use of a high pressure water jet in conjunction with a relatively low power laser to effect the slitting operation.

Another feature and advantage of this invention is the provision of a paper web slitting apparatus which permits the distance between the slit point and the point where the traveling web contacts the winder drum to be short.

Other objects, features and advantages of the invention will become readily apparent to those skilled in the art upon reading the following description of the preferred embodiments in conjunction with the attached drawings.

BRIEF DESCRIPTION OF THE DRAWINGS

FIG. 1 is a side-elevational view, somewhat schematic in form, showing a water jet slitting nozzle and laser focused on a traveling paper web held taut over a water trough between a guide roll and a winder drum.

FIG. 2 is a close-up side-elevational view of the water jet and laser shown in FIG. 1.

FIG. 3 is another side-elevational view, similar to the views in FIGS. 1 and 2, but showing the water jet nozzle and laser focused at machine-direction aligned, but spaced, points on the traveling web.

DETAILED DESCRIPTION OF THE PREFERRED EMBODIMENTS

Figure 4:
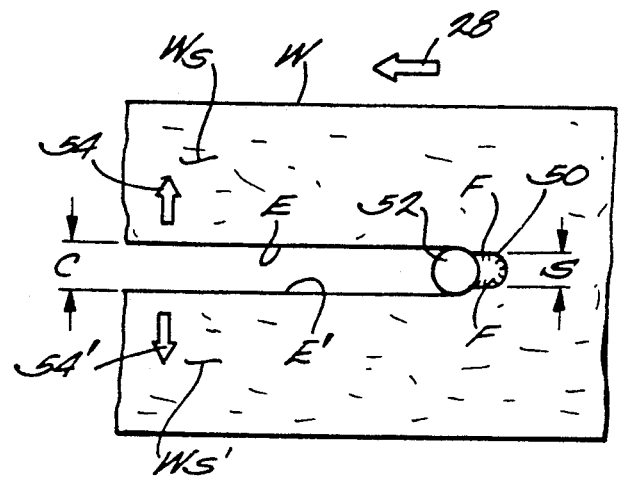
FIG. 4 is a plan view of a traveling paper web showing, in exaggerated form, the web severance and cut by the water jet and laser, respectively, of the apparatus shown in FIGS. 1 and 2.

As shown in FIG. 1, a roll of paper 10 which is rotatively supported on an unwind stand 12, is being unwound in the direction of arrow 14. The paper web W passes over the lower surface of a rotatable guide roll 16 over the upper surface of a trough, generally designated with numeral 18, and onto the lower surface of the front drum of a two-drum winder 19 which is winding the web into a new wound roll 20. The unwind stand, guide roll and two-drum winder are all well-known in the papermaking art and will not be discussed in detail further.

Referring to FIG. 2, trough 18 comprises an enclosed vessel 22 having an opening 24 in a curved top wall 26. In the preferred embodiment, vessel 22 comprises an elongate member extending substantially for the transverse width of the web W, and the opening 24 comprises a longitudinally extending slot, defined by a pair of spaced, parallel lips 25,25', and which extends along the length of the curved top for at least the width of the paper web W passing thereover.

The curved top is curved in an arc extending in the direction 28 of web travel so as to guide the traveling web in a curved path over its top surface and additionally produce a desired amount of web tension, or tautness, over the opening or slot as the trough is pressed into the web in the direction of arrow 30. This tautness can, of course, be produced by either moving the trough 18 in the direction 30 or, conversely, by moving the guide roll 16 downwardly opposite to direction 30 with reference to the orientation shown in FIG. 1.

A high pressure water jet nozzle 32 is shown disposed upstream of a laser 34. However, the relative orientation of the water jet nozzle and laser is not deemed to be of critical importance so long as the water jet nozzle and the laser are focused at the same general spot on the traveling web located over the slot, or opening, 24 in the top wall of the trough 18. However, it is important that the high pressure water jet nozzle be positioned relative to the laser so as to produce the web severing operation before the laser can trim the edges of the slit, as will be described in more detail subsequently.

At this point in the description, it might facilitate the understanding of the invention if the following terms to be used to describe the invention were explained in the context of their use and meaning relative to one another.

Accordingly, the term "sever" refers to the separation of the web into parts, portions or strips wherein the edges of the separated parts have no special condition and from which the ends of fibers protrude.

The term "cut" refers to a severance in the fibrous web where the edges of the parts have the ends of their protruding fibers cut off or removed, such as by being cut with a knife or burned away by a laser. Thus, a cut has a connotation of having smoother, more continuous, or defined edges than a severance.

The term "slit, or slitting" is used here as being generic to both sever and cut. It is used to describe, or refer to, the web severing procedure in the processing of paper during its manufacture wherein the web is separated longitudinally in the direction of web travel into one or more strips without particular concern regarding the condition of the edges of the strips produced.

The term "smooth" in reference to a strip edge refers to an essentially continuous, well defined line characterized by an absence, or near absence, of fiber ends or feathered portions protruding from the edge.

The term "spot" connotes a place having a small area, such as a small circle, as opposed to a point which essentially has no area. In this context, therefore, a laser focused over a spot which is moved longitudinally along the length of a traveling paper web creates a cut having a small, but definite, width in the web. In other words, the web traveling beneath the laser spot produces strips having laterally spaced edges.

Finally, in this discussion, corresponding elements in different embodiments will be correspondingly numbered with different letter postscripts to distinguish between them. Similarly, corresponding elements in the same embodiment will be numbered the same with different prime superscripts used to distinguish between them.

In FIG. 3, the high pressure water jet nozzle 32a is aligned in tandem with the laser 34a and is disposed upstream of the laser in the direction 28 of web travel. In the trough 18a, corresponding openings 24a,24a' are located in the top wall 26a beneath the water jet nozzle 32a and laser 34a, respectively. As in the embodiment shown in FIG. 2, openings 24a,24a' can take the form of either a hole beneath the jet nozzle or laser, or comprise a slot extending longitudinally in the trough. In either case, the tension of the web over the lips defining the openings produces a taut span in the web. In this arrangement, the web severing function provided by the high pressure water jet 36a and the cutting function provided by the laser beam 38a are separated to a greater extent to provide more control over the operation of both functions. A wall 40 extends longitudinally along the trough between the openings 4a,24a' in the upper wall.

In both of the configurations shown in FIGS. 2 and 3, the laser is equipped with a concentrically disposed chamber 42,42a which has an annular nozzle 44,44a concentric with the laser beam 38,38a so as to surround the laser beam with a stream of pressurized air supplied by an air pump 46,46a which introduces the pressurized air into the chamber 42,42a through a tube 48,48a and out through opening 45,45a.

In operation, with reference to FIGS. 1, 2 and 4, a traveling web W is unwound from a roll of paper 10 and is guided over the surfaces of rotating guide roll 16 and the first drum 17 of two-drum winder 19. A curved surface 26 of a trough 18 is brought into sliding engagement with the lower surface of the web W as it travels in the direction 28 to produce tension in the web. An elongate slot 24 in the curved top wall 26 of the trough thus creates a taut span between the leading and trailing lips 25,25' in the slot 26. The web, thus supported by the lips, offers considerable resistance to the impingement force of the water jet 36 emitted under high pressure from water nozzle 32 against a spot 50 (FIG. 4) on the top surface of web W.

Also aimed at a spot 52 (FIG. 4) on the web, which spot 52 is either no further upstream than spot 50, and preferably is slightly downstream of spot 50, is laser beam 38. The force of the impinging jet of water 36 severs the web and creates a severance S having a width equal to the diameter of the water jet 36.

The web severance produced by the impinging water jet does not cut individual fibers in the paper web W but, rather, abrades the wood pulp fibers comprising the paper web and washes away fines, fillers and, perhaps, individual short paper fibers to produce the severance. However, this abrading action by the water jet leaves the ends F of individual fibers extending from the edges E of the severance extending into the severance from either side thereof.

The laser beam 38, which does not have to be powerful enough to pierce the paper web by itself, can, therefore, have its beam aligned with the slit S such that the cross-machine distance or diameter of the spot of the laser beam 52 extends for a diameter at least equal to the slit width S and, optionally, for a cut distance C which is slightly greater than the distance S. In either case, the laser burns away at least the ends F of the individual fibers extending into the slit such that the cut C produced has edges E,E', which are smooth and continuous. It is within the concept of the invention that a small portion of the edges themselves can be burned away in the process to produce the smooth, continuous edges.

To facilitate the water jet/laser slitting process, a source of pressurized air, such as supplied by air pump 46, via tube 48 to an air nozzle 44 blows compressed air against the slit through an annular opening 45 about the laser beam 38.

Beneath the web W is the vessel 22 which catches and collects the water from the water jet. This water also intercepts any particles, such as fines, fillers and protruding ends of fibers liberated by the laser beam. The water pool in the vessel 22 also serves to intercept and diffuse the laser beam and to screen the laser beam from the eyes of operating personnel who might be near the apparatus.

Figure 5:
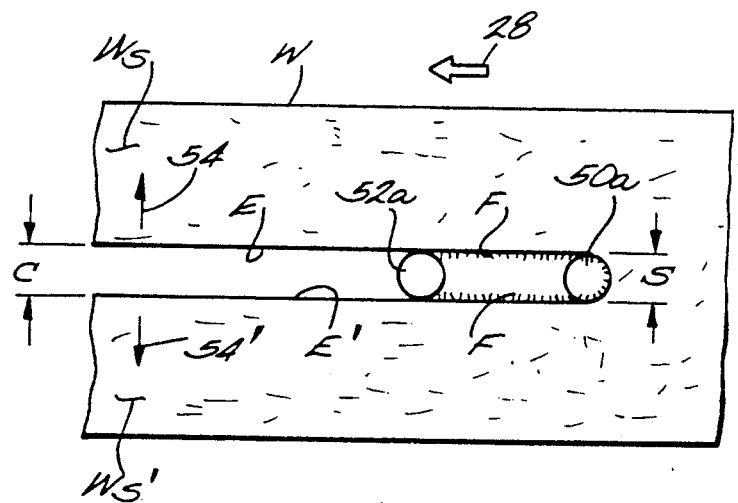
FIG. 5 is a plan view of a traveling web showing, in exaggerated form, the web severance and cut by the water jet and laser, respectively, of the apparatus shown in FIG. 3.

In the embodiment shown in FIGS. 3 and 5, the water jet and laser have been spaced further apart along the direction 28 of web travel so as to essentially be in tandem. Except for the fact that the water jet and laser beam are aimed at different spots 50a,52a (FIG. 5) on the web, the operation of the apparatus to produce the slit is the same as described in conjunction with FIGS. 1, 2 and 4. In this embodiment, the laser spot 52a is of the same diameter as the water jet spot 50a so the protruding fiber ends F are the only material encountered by the laser beam so the cut C and the smooth, continuous edges E,E' produced by burning off the protruding ends F of the fibers can be effected with a laser having even less power than the laser used in conjunction with FIGS. 1, 2 and 4. Since the water jet and laser beam are directed to different areas on the web, this arrangement also permits somewhat greater flexibility in fine-tuning the apparatus to both sever the web S and create the cut C.

Finally, the trough 18,18a in either embodiment can be bowed in its longitudinal direction, that is, about an axis extending in the direction of web travel, so as to produce a slight spreading force on the slit web to maintain the slit portions Ws,Ws' biased outwardly away from one another in the direction of arrows 54,54'.

Thus, an apparatus and method have been shown and described which achieves the objects and exhibits the features and advantages set forth. It is anticipated that variations in the invention can be made without departing from the spirit and scope of the appended claims. Accordingly, such variations are intended to be within the scope of the claims.

What is claimed is:

1. Apparatus for producing a smooth cut in a traveling fibrous web comprising, in combination:
   means for supporting the traveling fibrous web in a relatively taut span;
   trough means disposed proximate the web on one side thereof;
   water jet means disposed proximate the web on the other side of the web and arranged to direct a web severing water jet against the web over the trough means to thereby produce a pair of spaced, severed edges in the web, each of the edges having fibers protruding therefrom;
   laser means disposed proximate the traveling web on the same side thereof as the water jet means to direct a fiber cutting laser beam against the edges of the traveling web severed by the water jet to cut at least the ends of the fibers protruding from the severed edges;
   wherein a smooth cut is efficiently produced in the traveling web.

2. Apparatus for producing a smooth cut in a traveling web, as set forth in claim 1, wherein:
   the water jet and laser beam are aimed at somewhat overlapping spots on the surface of the traveling web.

3. Apparatus for producing a smooth cut in a traveling web, as set forth in claim 1, wherein:
   the laser beam is focused at a spot on the traveling web downstream of a spot where the water jet impinges upon the traveling web.

4. Apparatus for producing a smooth cut in a traveling web, as set forth in claim 1, wherein:
   the trough means includes a trough curved about an axis extending in the direction of web travel, whereby a slight spreading force on the slit portions is created to maintain the slit portions biased transversely of the direction of web travel.

5. A method for producing a smooth cut in a traveling fibrous web comprising the steps of:
   1) supporting the traveling fibrous web in a relatively taut span;
   aiming a water jet to impinge upon one side of the traveling web to sever the web into edged portions on either side of the severance, the edges of each portion having fibers protruding therefrom into the space between the severed portions;
   aiming a laser beam at a spot over both severed edges not upstream of the severance produced by the water jet to thereby cut at least the ends of the fibers protruding from the severed edges to produce a smooth cut in the traveling web.

6. The method for producing a smooth cut in a traveling web, as set forth in claim 5, wherein:
   the water jet and laser beam are both aimed at the same side of the web.

7. A method for producing a smooth cut in a traveling web, as set forth in claim 5, further including the steps of:
   directing a stream of pressurized air about the laser beam to urge particles of the fibrous web burned by the laser beam downwardly and away from the traveling web; and
   collecting the particles and debris produced by the water jet and laser on the other side of the web.

8. The method of producing a smooth cut in a traveling web, as set forth in claim 5, wherein:
   the laser beam spot is greater in width than the space between the severed portions of the web.

9. Apparatus for producing a smooth cut in a traveling web, as set forth in claim 1, wherein:
   the laser is positioned to direct its beam into the water from the water jet accumulated in the trough means.

10. The method of producing a smooth cut in a traveling web, as set forth in claim 5, further including the steps:
    collecting the water from the water jet in a trough beneath the traveling web;
    positioning the laser to direct its beam into the water accumulated in the trough.

* * * * *